(12) United States Patent
Tanizaki et al.

(10) Patent No.: US 7,424,846 B2
(45) Date of Patent: Sep. 16, 2008

(54) PNEUMATICALLY STATIC BALANCER FOR MACHINE TOOL

(75) Inventors: Akira Tanizaki, Toyama (JP); Akira Takase, Toyama (JP); Shiro Murai, Toyama (JP)

(73) Assignee: Nippei Toyama Corporation, Tokyo (JP)

(*) Notice: Subject to any disclaimer, the term of this patent is extended or adjusted under 35 U.S.C. 154(b) by 171 days.

(21) Appl. No.: 11/403,878

(22) Filed: Apr. 14, 2006

(65) Prior Publication Data
US 2006/0242959 A1    Nov. 2, 2006

(30) Foreign Application Priority Data
Apr. 18, 2005  (JP) ............................. P.2005-119116
Dec. 19, 2005  (JP) ............................. P.2005-364903

(51) Int. Cl.
*B23Q 11/00*   (2006.01)
*B23B 47/26*   (2006.01)

(52) U.S. Cl. ........................................ 91/196; 92/181 R (58) Field of Classification Search ............... 91/196; 92/181 R, 182
See application file for complete search history.

(56) References Cited

U.S. PATENT DOCUMENTS

| 3,319,534 | A | * | 5/1967 | Boonshaft | 92/181 R |
| 4,389,781 | A | * | 6/1983 | Donaldson | 33/1 M |
| 4,507,868 | A | * | 4/1985 | Tuss | 33/1 M |
| 4,799,316 | A | * | 1/1989 | Tuss | 33/1 M |
| 6,473,161 | B1 | * | 10/2002 | Cuijpers et al. | 355/53 |

FOREIGN PATENT DOCUMENTS

JP    10-138081 A    5/1998

* cited by examiner

*Primary Examiner*—Thomas E Lazo
(74) *Attorney, Agent, or Firm*—Sughrue Mion, PLLC (57) ABSTRACT

A pneumatically static balancer for a machine tool counterbalances or lightens a gravitational load generated by an own weight of a vertically moving driven member. The pneumatically static balancer includes a pneumatic cylinder supporting the driven member and allowed to move vertically, a pneumatically static bearing having a piston inserted into the pneumatic cylinder, the pneumatic static bearing being formed by feeding compressed air, which is in an interior of the pneumatic cylinder, into a small clearance formed between the pneumatic cylinder and the piston, a cylinder rod connected to an upper end of the piston and a saddle supporting a leading end portion of the cylinder rod.

3 Claims, 8 Drawing Sheets

PNEUMATICALLY STATIC BALANCER FOR MACHINE TOOL

BACKGROUND OF THE INVENTION

1. Field of the Invention

The present invention relates to a pneumatically static balancer for a machine tool to be used with a driven member of a vertical shaft.

2. Description of the Background Art

In a vertically moving drive device such as a main spindle head in a vertical machine tool or a saddle of a horizontal machine tool, there is known a balancer which has such a balancer mechanism as is compatible to weight of a driven member so as to prevent the driven member from falling or to apply no load to a motor at a stopping time. This balancer is categorized as a counter balancer type, a liquid pressure cylinder type using oil or water pressure, an air pressure cylinder type or the like. In these kinds of balancers, for aiming at reducing the space, a hydraulic cylinder, which is arranged coaxially with the driven member, is known.

Figure 7:
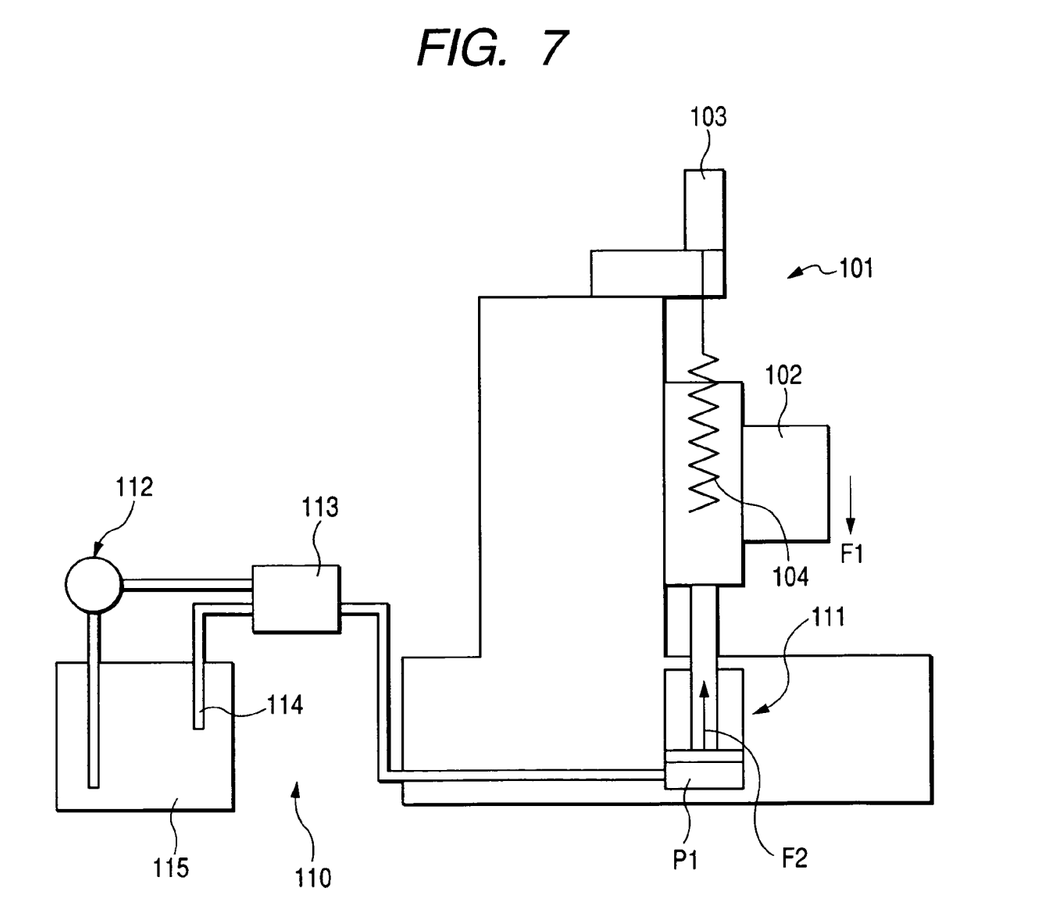
FIG. 7 is a conceptional diagram showing a known balance mechanism of a vertical machining center.

FIG. 7 is a conceptional diagram showing a known balance mechanism of a vertical machining center as a machine tool. As shown in FIG. 7, a machine tool 101 is provided with a driven member 102 which vertically moves against the gravity. By a rotating drive of a drive mechanism 103 of a motor, a feed screw 104 is rotated to move the driven member 102 vertically. In a bed below the driven member 102, there is disposed hydraulic cylinder 111, from which a cylinder rod extends to support the lower face of the driven member 102.

In a balance mechanism 110, the pressure of oil to be fed from a pressure source 112 to the hydraulic cylinder 111 is adjusted by pressure adjusting means 113 to such a pressure P1 that the force to act on the piston of the hydraulic cylinder 111 is adapted to counterbalance a gravitational load F1 of the driven member 102. The excess oil to be fed from the pressure source 112 to the pressure adjusting means 113 is circulated to a tank 115 on the side of the pressure source 112 through a drain 114.

However, frictional resistance of a seal member disposed between the piston of the hydraulic cylinder 111 and the hydraulic cylinder 111 obstructs the action of the driven member 102. In case the driven member 102 is subjected to a slow or extremely minute feed, moreover, a stick slip phenomenon is caused due to the difference between a dynamic friction resistance and a static friction resistance to act between the piston of the hydraulic cylinder 111 and the outer cylinder of the hydraulic cylinder, thereby to raise a problem that the driven member cannot be highly precisely positioned. Since the feeding action becomes unstable, moreover, it has been desired that the resistance to the drive of the balancer be minimized.

Figure 8:
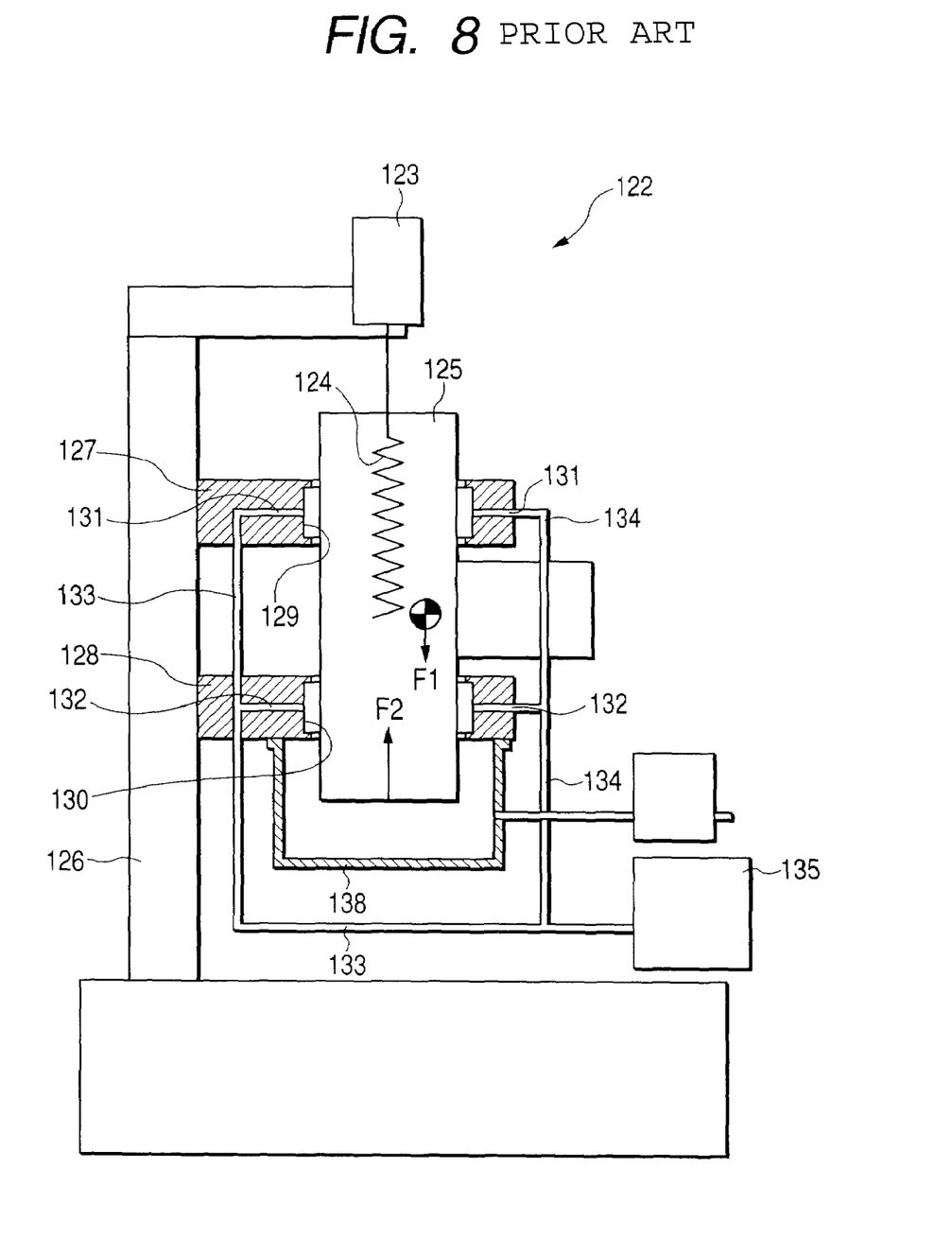
FIG. 8 is a schematic diagram showing a known balance mechanism of another vertical machining center.

FIG. 8 is a schematic diagram showing a balance mechanism of another known vertical machining center. In the balance mechanism having improved the aforementioned problems, as shown in FIG. 8, a machine 122 is constituted such that a driven member 125 is vertically fed by a feed screw 124 rotationally driven by a motor 123. The driven member 125 is exemplified by a saddle, a working head or the like in a machine tool and is vertically moved along a post 126, as called a column or the like.

On the upper and lower portions of the right side of the post 126, there are fixed two sliding support members 127 and 128 which constitute a pneumatically static guide mechanism. The driven member 125 is attached so vertically slidably as is fitted in those sliding support members 127 and 128. In the inner circumferences of the through holes of the sliding support members 127 and 128 passing the driven member 125 therethrough, there are formed circumferential grooves 129 and 130 which are individually divided into three or more circumferential portions. In interiors of the sliding support members 127 and 128, there are formed conduits 131 and 132 of the same number as that of the circumferential grooves 129 and 130. These conduits 131 and 132 communicate with the circumferential grooves 129 and 130, respectively. The conduits 131 and 132 are connected to a pressure source 135 composed of an air compressor and so on through external conduits 133 and 134, respectively.

Moreover, a closed chamber 138 of a bottomed container shape is so integrally fixed to the sliding support member 128 as to enclose the lower end portion of the driven member 125.

In order the driven member 125 may not receive the frictional resistance of the seal member, the closed chamber 138 reserves the air having leaked from a static pressure bearing portion, in the chamber enclosed by one driven member by using the slide faces of the sliding support members 127 and 128 as the static pressure bearing. The closed chamber 138 supports the driven member as a kind of air pressure cylinder.

However, because the above-described apparatus support the gravitational load by the air pressure fed to the one outlet closed chamber of the pneumatically static guide mechanism, a larger chamber than the driven member is required thereby to raise a problem that the device is enlarged (as referred to Japanese Patent Unexamined Publication No. JP-A-10-138081, Paragraph Nos. 0007-0020, FIG. 1 and FIG. 6).

SUMMARY OF THE INVENTION

Therefore, the invention has been conceived to solve those problems, and has an object to provide a pneumatically static balancer for a machine tool, in which a guide mechanism of a driven member to be moved by a vertical shaft is made into a static pressure bearing without enlarging the size of a device, which can be reliably moved even with an ultra-minute moving command of 0.1 μm by reducing the frictional resistance of a piston of the balancer substantially to zero and by minimizing the driving load resistance of the driven member, and which becomes a balance mechanism having high rigidity.

According to a first aspect of the invention, there is provided a pneumatically static balancer for a machine tool, which counterbalances or lightens a gravitational load generated by an own weight of a vertically moving driven member, the pneumatically static balancer comprising:

a pneumatic cylinder supporting the driven member and allowed to move vertically;

a pneumatically static bearing having a piston inserted into the pneumatic cylinder, the pneumatic static bearing being formed by feeding compressed air, which is in an interior of the pneumatic cylinder, into a small clearance formed between the pneumatic cylinder and the piston;

a cylinder rod connected to an upper end of the piston; and a saddle supporting a leading end portion of the cylinder rod.

According to a second aspect of the invention, it is preferable that the pneumatically static balancer for the machine tool as set forth in the first aspect of the present invention, further comprising a spherical bearing supporting the leading end portion of the cylinder rod.

According to a third aspect of the invention, as set forth in the first aspect of the invention, it is more preferable that the piston comprises:

a plurality of air communication holes communicating with the interior of the pneumatic cylinder; and a plurality of static pressure nozzles individually communicating with the air communication holes, the static pressure nozzles provided on an outer peripheral portion of the piston.

According to a fourth aspect of the invention, as set forth in the third aspect of the invention, it is suitable that a ring groove is formed on an upper side of the piston and near the central portion of the piston, the ring groove has an air exhaust passage formed in the axial direction of the pneumatically static bearing and the air exhaust passage communicates a first hole formed on the ring groove of the piston with a second hole formed on a lower face of the piston, the air exhaust passage is connected to a valve via the second hole.

According to a fifth aspect of the invention, as set forth in the first aspect of the invention, it is more suitable that vertical grooves, of which lower end do not reach to a lower end of the piston, are formed on an outer peripheral surface of the piston in the axial direction for communicating the compressed air in the interior of the pneumatic cylinder.

According to the first aspect of the invention, it is possible to provide a pneumatically static balancer for a machine tool, in which a static pressure bearing of a guide mechanism of a driven member to be moved by a vertical shaft can be made without enlarging the size of a device, in which the frictional resistance of a piston of a driven member balancer can be reduced substantially to zero, which can be reliably moved even with an ultra-minute moving command of 0.1 μm by minimizing the driving load resistance of the driven member, and which becomes a compact and highly rigid balance mechanism.

According to the second aspect of the invention, the leading end portion of the cylinder rod is supported by the spherical bearing so that the cylinder rod is supported by a low-resistance bearing such as a kind of universal joint. This makes it possible to absorb an eccentricity and a fine geometric distortion thereby to eliminate the frictional resistance of the piston.

According to the third aspect of the invention, the piston is provided with the plural air communication holes, and said piston is provided in its outer peripheral portion with the static pressure nozzles individually communicating with air communication holes. As a result, the cylinder can be made thin. Moreover, when the driven member descends, the cylinder internal pressure rises to enhance the air feed to the static pressure bearing thereby to improve the bearing effect and to ensure the non-contact stable balance support at all times. Moreover, the frictional resistance of the piston of the driven member balancer can be reduced substantially to zero to minimize the driving load resistance thereby to move the driven member reliably even with the ultra-minute moving command.

According to the fourth aspect of the invention, the piston is provided on the upper side and near the central portion thereof with a ring groove, which has an air exhaust passage for communicating the ring groove side with a lower face side of the piston, and the air exhaust passage is connected to a valve via a second hole formed on the lower face of the piston. As a result, it is possible to reduce the frictional resistance of the piston of the driven member balancer substantially to zero and to minimize the driving load resistance thereby to ensure the movement even with the ultra-minute moving command.

According to the fifth aspect of the invention, the piston is provided vertically in its outer peripheral surface with vertical grooves for communicating air, and lower ends of the vertical grooves do not reach to the lower end of the piston (that is, the lower end portions of the vertical grooves are formed into a not-go shape.) As a result, it is possible to reduce the frictional resistance of the piston of the driven member balancer substantially to zero and to minimize the driving load resistance thereby to ensure the movement even with the ultra-minute moving command.

DETAILED DESCRIPTION OF THE PREFERRED EMBODIMENTS

Embodiments of the invention are described in detail in the following with reference to the accompanying drawings.

Figure 1:
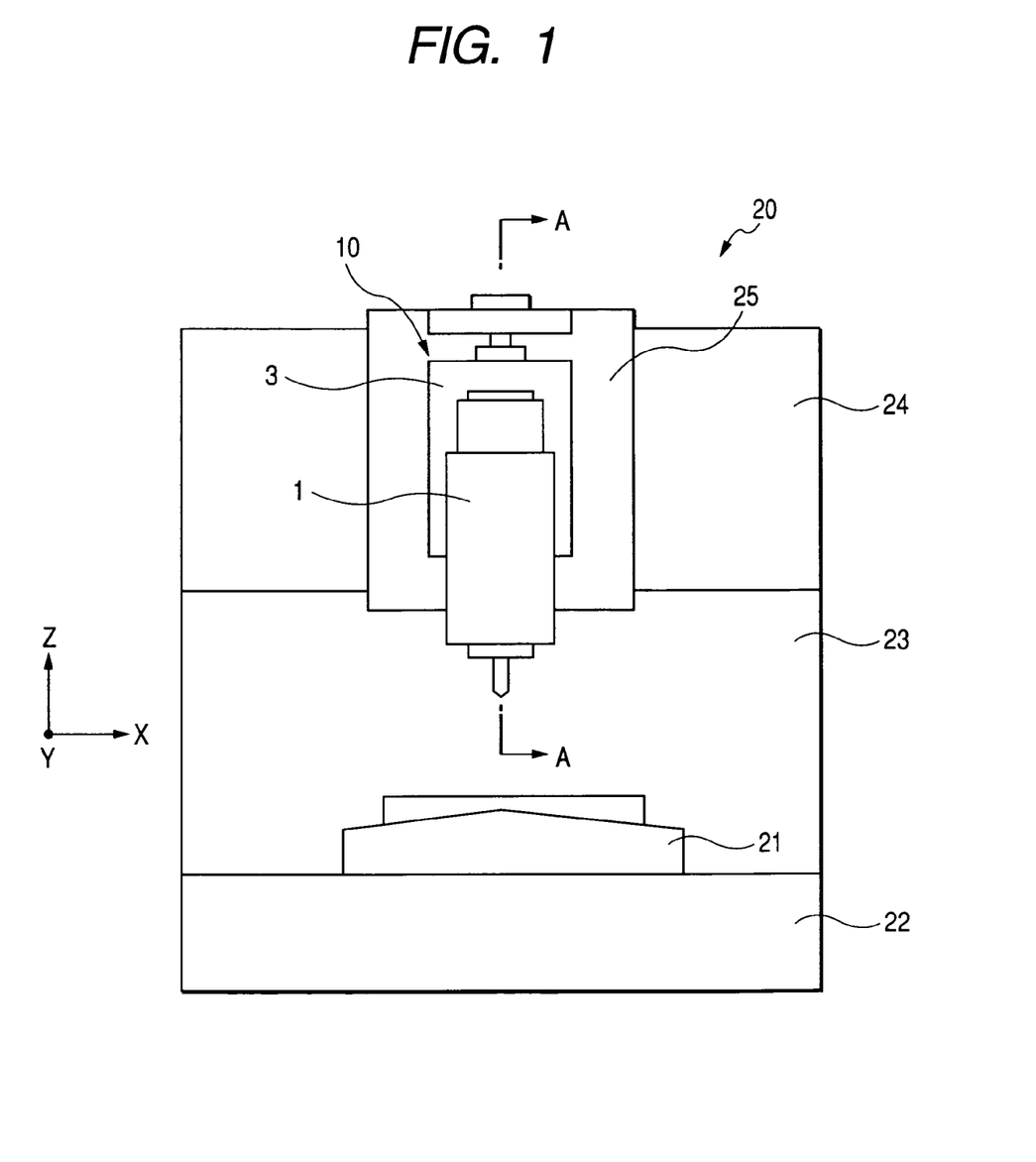
FIG. 1 is a schematic front elevation showing the entirety of a vertical machine tool.

FIG. 1 is a schematic front elevation showing the entirety of a vertical machine tool. In a vertical machine tool 20, as shown in FIG. 1, a column 23 is fixed on a bed 22, and a saddle 25 made movable in an X-axis (or longitudinal) direction is arranged on an X-axis slide base 24 arranged on the column 23. Moreover, the saddle 25 is provided on its front face with a pneumatic cylinder 3, which is made movable in a Z-axis (or vertical) direction, and on which a main spindle head 1 as a driven member is fixed. Below the main spindle head 1, there is disposed a table 21 which mounts a work and which is made movable in a Y-axis (or cross) direction.

Figure 2A:
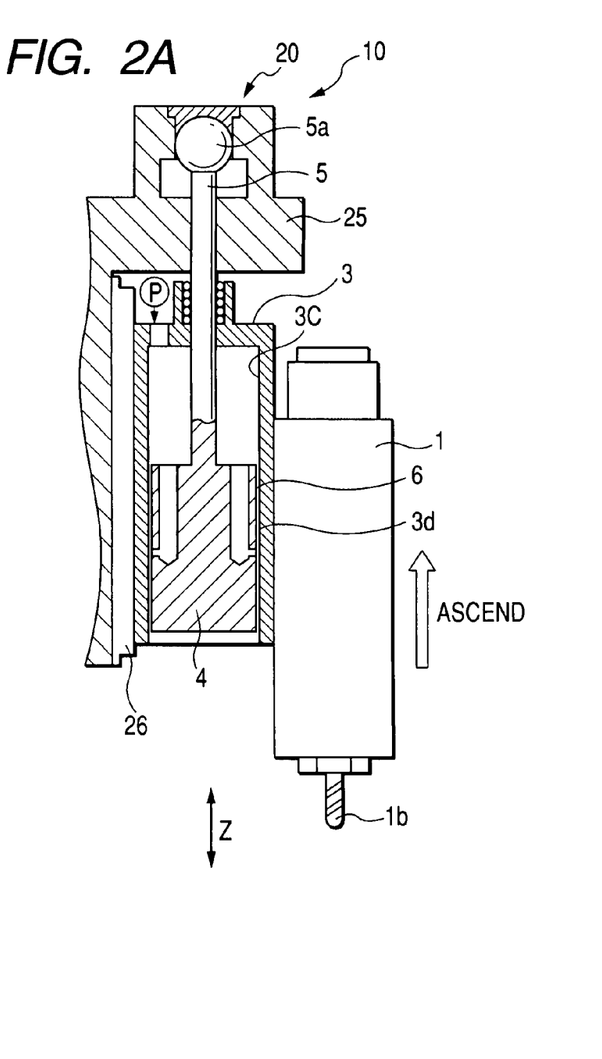
FIG. 2A is a sectional view take along line A-A of FIG. 1, and showing the state, in which a main spindle head is ascended.
Figure 2B:
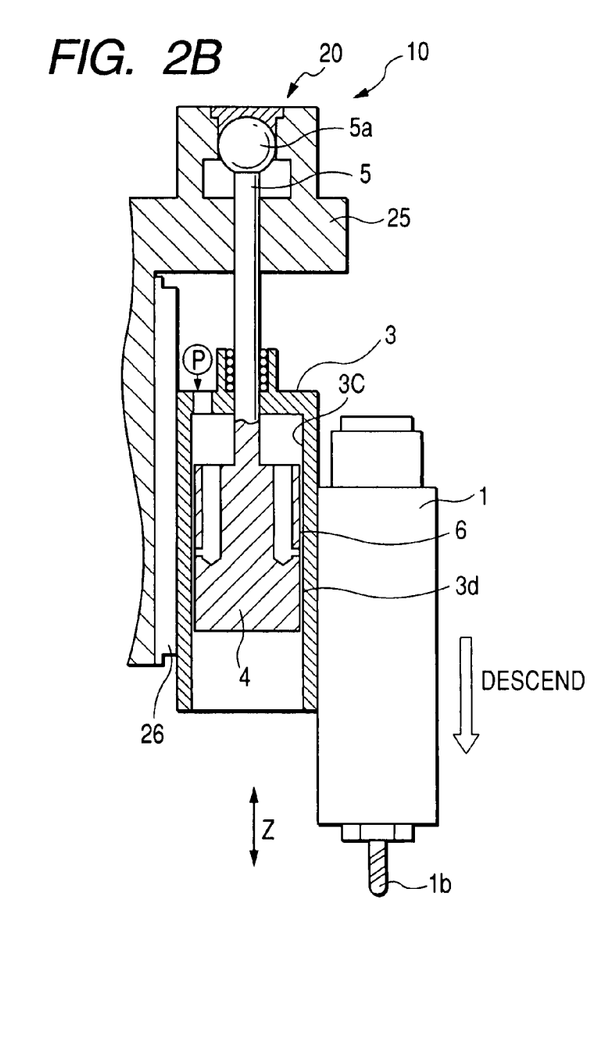
FIG. 2B is a sectional view take along line A-A of FIG. 1, and showing the state, in which the main spindle head 1 is descended.

FIG. 2 presenting sectional views taken along line A-A of FIG. 1, FIG. 2A is a sectional view showing the state, in which the main spindle head 1 is ascended, and FIG. 2B is a sectional view showing the state, in which the main spindle head 1 is descended. As shown in FIG. 2A, the saddle 25 of the vertical machine tool 20 is provided, in place of a ball screw and a servomotor, with a Z-axis linear motor 26, by which the pneumatic cylinder 3 is vertically driven.

In the pneumatic cylinder 3, on the other hand, there is mounted a pneumatically static balancer 10. This pneumatically static balancer 10 is a device for counterbalancing or lightening a gravitational load which is generated by the weight of the main spindle head 1 moving in the vertical direction of the vertical machine tool 20.

Into this pneumatic cylinder 3, a piston 4 is inserted. To the upper end portion of the piston 4, a cylinder rod 5 is connected. This cylinder rod 5 has its leading end portion formed into a spherical shape, which is supported by a spherical bearing 5a. The cylinder rod 5 is so connected to the upper end portion of the saddle 25 as to depend therefrom. In other words, the leading end portion of the cylinder rod 5 is supported on the saddle 25 by the spherical bearing 5a such as a universal joint.

As shown in FIG. 2A, the cylinder rod 5 supported at the upper end portion of the saddle 25 and the piston 4 are always held at identical height positions. Accordingly, at the time of ascending the main spindle head 1, the pneumatic cylinder 3 ascends so that the piston 4 relatively descends in the pneumatic cylinder 3.

The position, to which the main spindle head 1 has ascended, is the origin of the Z-axis. This position is either a start position by an NC program (Numerical Control program) or a standby position, which is taken as the original position after the end of the working by the NC program. Moreover, this position is spaced from the table 21 (as referred to FIG. 1), on which the work is placed, and has a height, where a tool is exchanged by an ATC device (Automatic Tool Changer device) without any interference with the work.

As shown in FIG. 2B, on the other hand, at the descending time of the main spindle head 1, the pneumatic cylinder 3 moves down so that the piston 4 relatively ascends in the pneumatic cylinder 3.

In this state, the main spindle head 1 has descended from the start position by the NC program, and the working is ended by the NC program so that the main spindle head 1 is on the way to the original position. Moreover, this position is a working position, at which the work (not-shown) placed on the table 21 is worked by a tool 1b fixed at the leading end portion of the main spindle head 1.

First Embodiment

Figure 3:
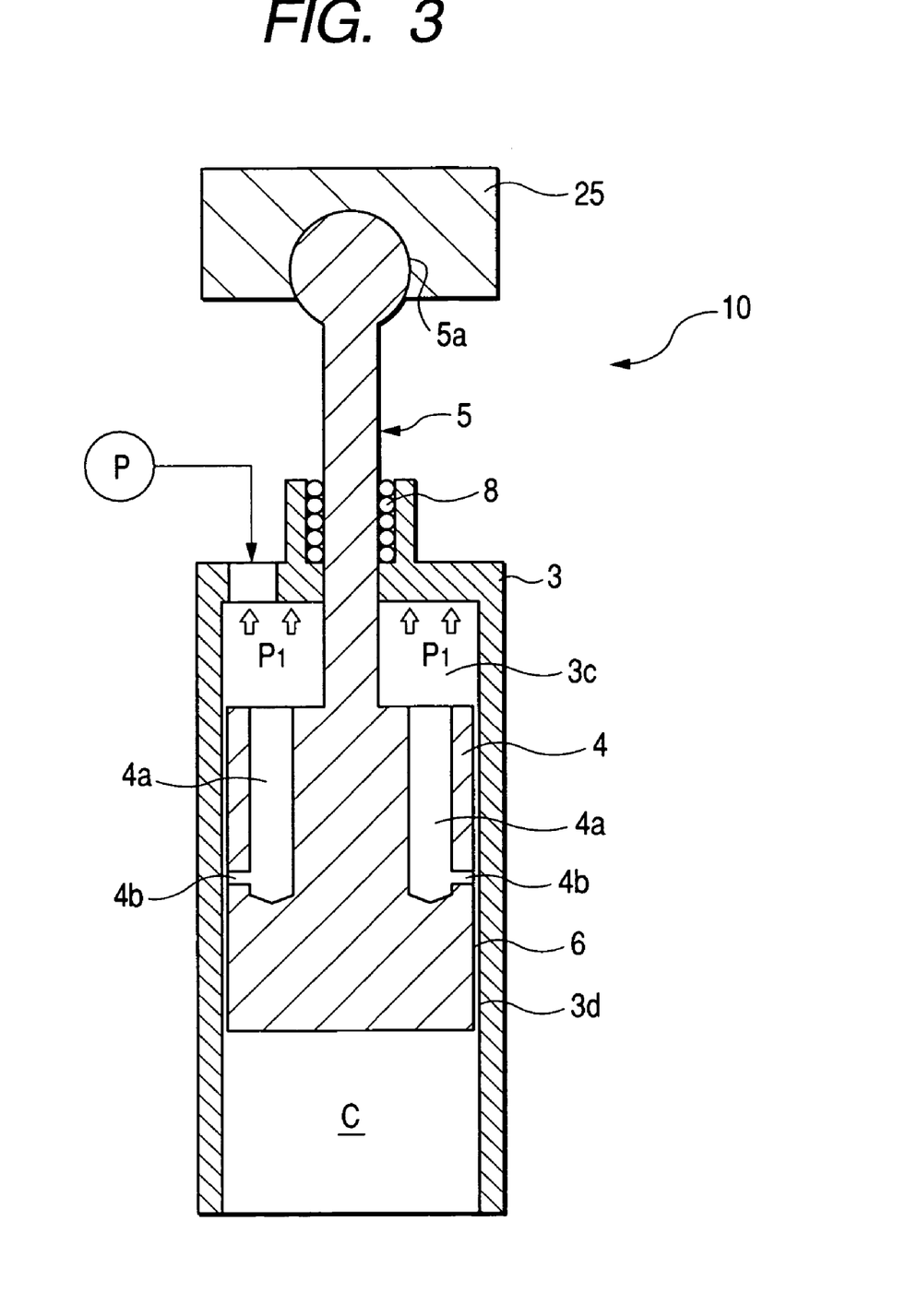
FIG. 3 is a sectional view showing a first embodiment and is taken along line A-A of FIG. 1.

FIG. 3 is a sectional view showing a first embodiment and is taken along line A-A of FIG. 1. As shown in FIG. 3, the sliding portion of the pneumatic cylinder 3 for passing the cylinder rod 5 therethrough is provided with a ball guide bushing 8.

Once the compressed air flows from an air pressure source P such as a compression pump into the interior 3c of the pneumatic cylinder 3, the pneumatic cylinder 3 is ascended by a pressure P1 to counterbalance or lightening the gravitational load which is generated by the weight of the main spindle head 1 or the pneumatic cylinder 3.

The piston 4 is provided with a plurality of air communication holes 4a, each of which has its one end opened to communicate with the cylinder interior 3c of the pneumatic cylinder 3. In the piston 4, there is formed static pressure nozzles 4b, which communicate with the air communication holes 4a from the outer peripheral portion of the piston 4. Via the static pressure nozzles 4b, the compressed air of the cylinder interior 3c is fed into a small clearance 3d formed between the pneumatic cylinder 3 and the piston 4.

The piston 4 is provided with the air communication holes 4a and the static pressure nozzles 4b communicating with the air communication holes 4a from the outer peripheral portion of the piston 4 so that the compressed air in the cylinder interior 3c flows into the small clearance 3d to raise the pressure near the static pressure nozzles 4b.

The piston 4 is provided in its outer peripheral portion with the four static pressure nozzles 4b, for example. Thus, the piston 4 of the pneumatically static balancer 10 of the Z-axis is statically supported with respect to the pneumatic cylinder 3 by action of the static pressure nozzles 4b disposed in the outer peripheral portion of the piston 4. As a result, no contact resistance is established between the piston 4 and the pneumatic cylinder 3 so that the driving load resistance in the Z-axis substantially becomes zero to cause no stick slip phenomenon. As a result, the pneumatic cylinder 3 can move reliably and precisely even with an ultra-minute moving command of 0.1 μm. Moreover, it is possible to provide the pneumatically static balancer 10 for the machine tool 20 as a compact and highly rigid balance mechanism.

According to the invention, the piston 4 is provided with the air communication holes 4a opened in the upper end of the piston 4 and the static pressure nozzles 4b communicating with the air communication holes 4a. As a result, the compressed air in the cylinder interior 3c can be also used as the air for a pneumatically static bearing 6. Therefore, the single air pressure source P can perform the two actions to ascend/descend the pneumatic cylinder 3 and to form the pneumatically static bearing 6 thereby to make the machine tool 20 simple and efficient. Especially when the main spindle head 1 (as the driven member) abruptly descends, moreover, the internal pressure of the pneumatic cylinder 3 rises to raise the action of the air feed to the pneumatically static bearing 6 so that the bearing effect can be improved to perform the non-contact and stable balance support at all times.

Moreover, the air communication holes 4a are formed on the side of the piston 4. Therefore, the air communication holes 4a need not be formed in the pneumatic cylinder 3, but the pneumatic cylinder 3 can be made thin to reduce the weight and size of the machine tool 20.

Moreover, the leading end portion of the cylinder rod 5 is formed into the spherical shape and is supported by the spherical bearing 5a. It is, therefore, possible to absorb the misalignment, which might otherwise occur due to an eccentricity or a geometric distortion between the pneumatic cylinder 3 and the piston 4.

Second Embodiment

Figure 4:
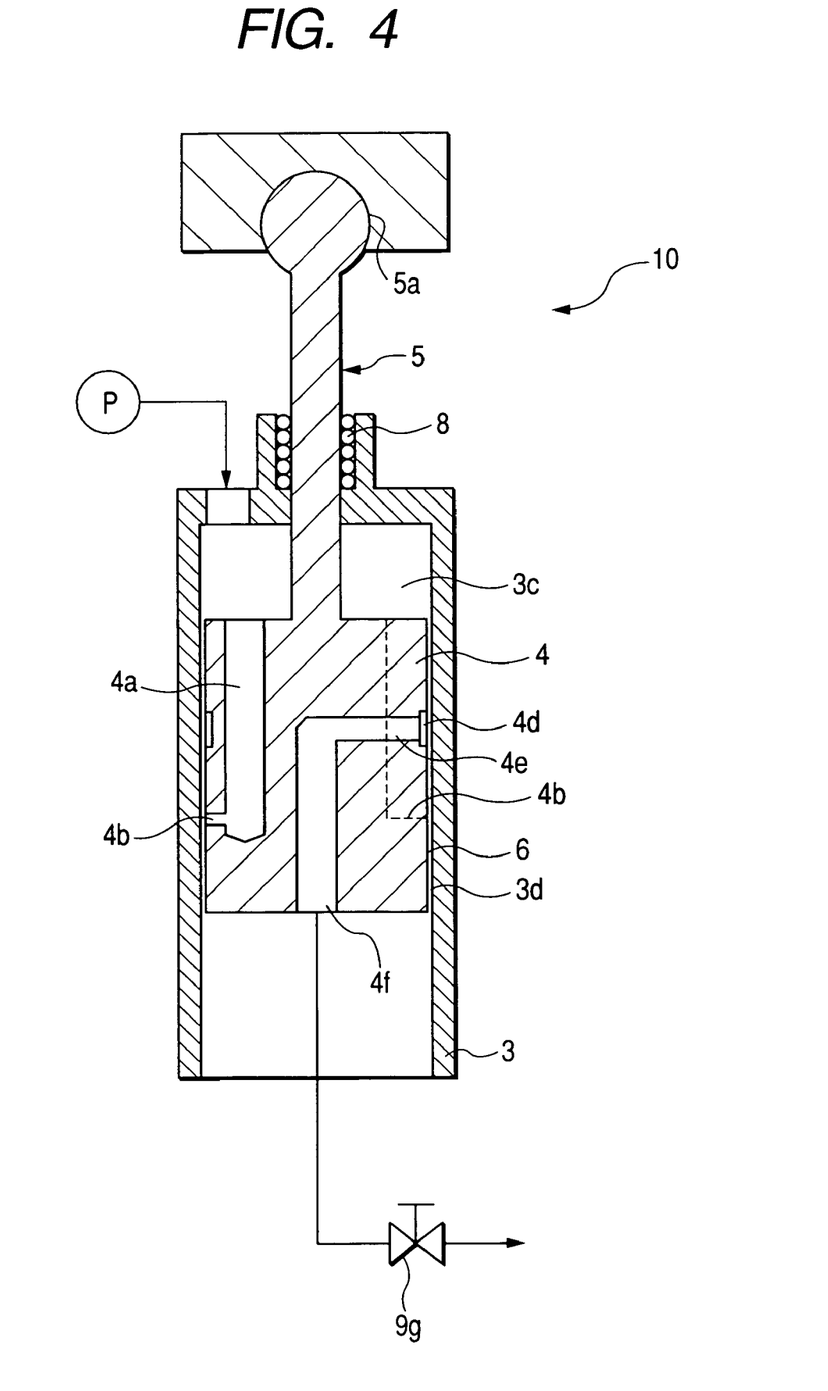
FIG. 4 is a sectional view showing a second embodiment and is taken along line A-A of FIG. 1.

FIG. 4 is a sectional view showing a second embodiment and is taken along line A-A of FIG. 1. As shown in FIG. 4, this second embodiment is characterized in that the piston 4 shown in FIG. 3 further includes a ring groove 4d, which is positioned on the upper side of vicinity of the central portion thereof. This ring groove 4d is provided with such an air exhaust 4e for the pneumatically static bearing 6 as extends radially inward. In the piston 4, on the other hand, an air exhaust 4f to communicate with the air exhaust 4e is formed to extend axially upward from the lower end face of the piston 4. The air exhaust 4f is connected to a valve 9g (as located on the right side of the drawing). In other words, the air exhausts 4e and 4f constitute a air exhaust passage having a first hole on the ring groove and a second hole on a lower face of the piston. The second hole connects the air exhaust passage with the valve 9g. The ring groove 4d is formed at a substantially intermediate portion in the vertical direction of the piston 4 between the upper end of the piston 4 and the static pressure nozzle 4b.

In this second embodiment, the static pressure air is released via the ring groove 4d, the air exhausts 4e and 4f by opening the valve 9g. According to this constitution, the pressure difference between the vicinity of the ring groove 4d and the vicinity of the static pressure nozzle 4b is enlarged to form a static pressure bearing having high rigidity in the small clearance 3d between the pneumatic cylinder 3 and the piston 4. By adjusting the throttling amount of the valve 9g, moreover, the static pressure force and the air consumption can be adjusted to a proper balance.

Third Embodiment

Figure 5A:
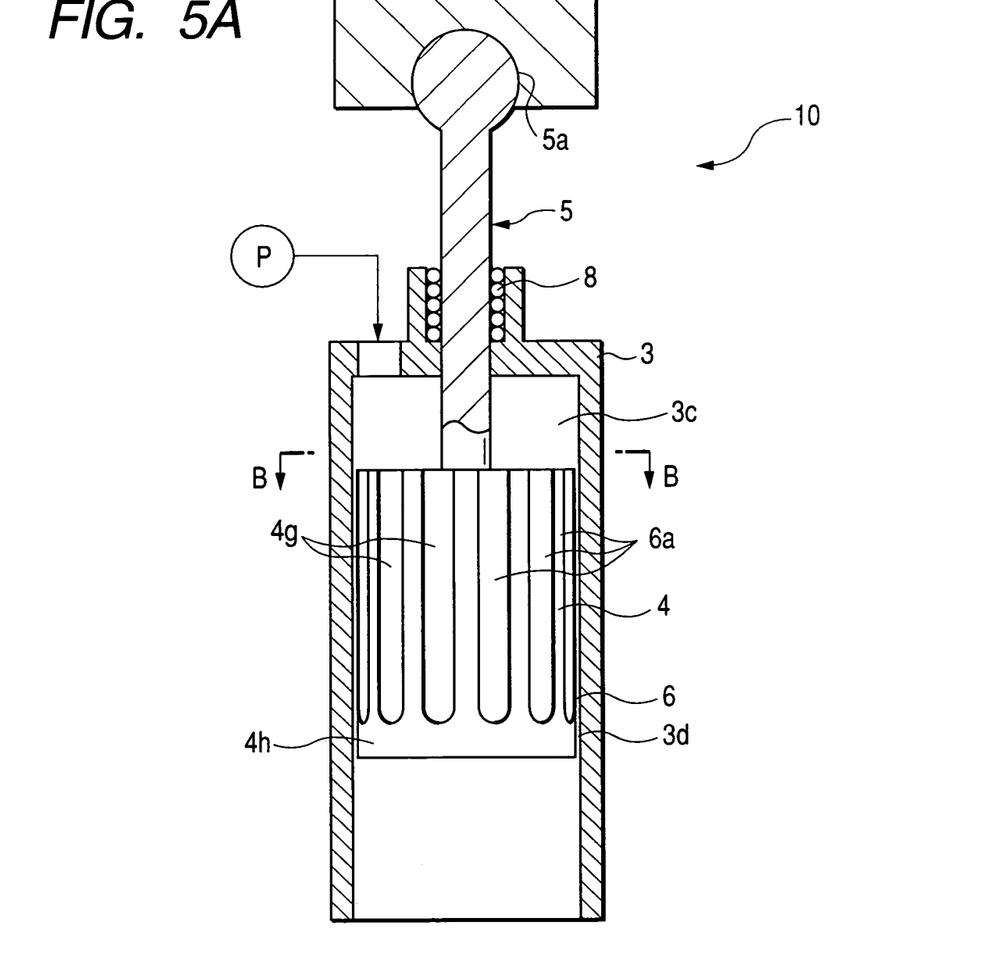
FIG. 5A is a sectional view showing a third embodiment taken along line A-A of FIG. 1.
Figure 5B:
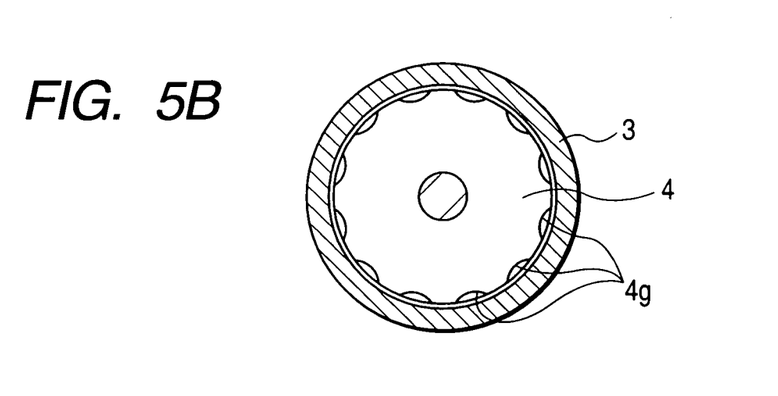
FIG. 5B is a sectional view showing the third embodiment taken along line B-B of FIG. 5A.

FIGS. 5A and 5B show a third embodiment, FIG. 5A is a sectional view taken along line A-A of FIG. 1, and FIG. 5B is a sectional view taken along line B-B of FIG. 5A. As shown in FIG. 5B, vertically extending vertical grooves 4g are formed in the outer circumference of the piston 4. These vertical grooves 4g are formed in plurality (e.g., twelve) and arranged equidistantly in the circumferential direction of the piston 4. As shown in FIG. 5A, the vertical grooves 4g have their lower end portions formed into a not-go shape. Specifically, the vertical grooves 4g are not provided entirely of the axial direction of the piston 4 but are formed to extend from the upper end of the piston 4 but to stop short of the lower end. At the lower end portion of the piston 4, moreover, there is formed a cylindrical face 4h which does not have the vertical grooves 4g. In short, the lower ends of the vertical grooves 4g do not reach to the lower end of the piston 4. According to this constitution, the compressed air flows, when fed from the air pressure source P, into the vertical grooves 4g. As a result, vertically extending static pressure air layers 6a are formed around the piston 4.

Figure 6:
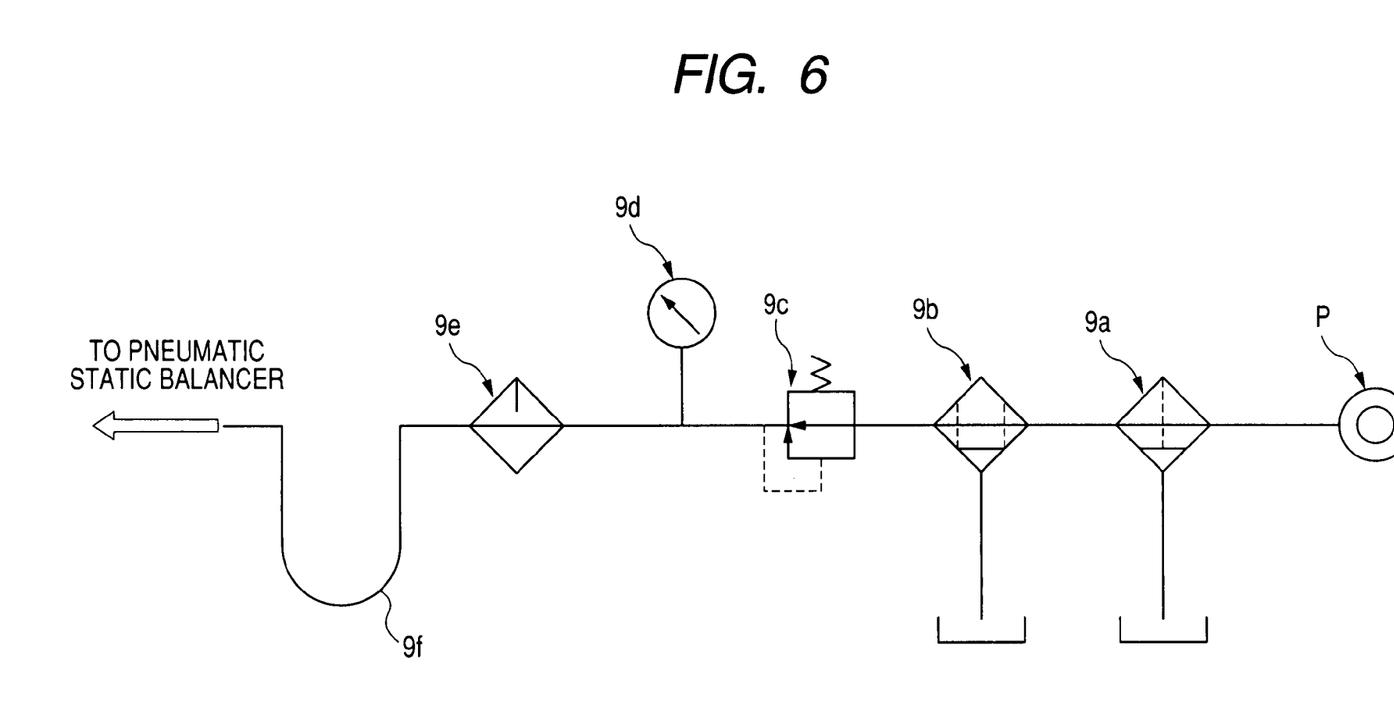
FIG. 6 is a pneumatic circuit diagram.

FIG. 6 is a pneumatic circuit diagram. As shown in FIG. 6, an air circuit for feeding the compressed air into the aforementioned pneumatically static balancer is provided with air filter 9a, a mist separator 9b, a regulator 9c, a pressure gauge 9d and an oiler (as also called a lubricator) 9e, which are recited sequentially toward the downstream from a compressor (or the air pressure source P) such as a pump. The air filter 9a traps moisture and dust in the air which is compressed by the air pressure source P. The mist separator 9b traps finer mist (having a particle diameter of about 0.3 μm, for example) than the mist (having a particle diameter of about 5 μm) which is trapped by the air filter 9a. The regulator 9c sets the compressed air at an optimum set pressure, and holds the set pressure. The pressure gauge 9d is disposed midway of the passage on the downstream of the regulator 9c, and measures the pressure. The oiler 9e makes lubricating oil as mist and applies the mist oil to the compressed air. The oiler 9e is connected to the (not-shown) supply port of the pneumatically static balancer 10 through a flexible tube 9f.

Incidentally, the supply pressure of the air pressure source P is 0.5 MPa.

Here are described the actions of the pneumatically static balancer 10.

(1) When a start button of a (not-shown) control panel, the compressed air flows from the air pressure source P (as referred to FIG. 6) into the interior 3c of the pneumatic cylinder 3 (as referred to FIG. 2), so that pressure P1 (as referred to FIG. 3) compatible to the mass of the driven member acts and balances to apply no load to the Z-axis linear motor 26 (as referred to FIG. 2) at a stopping time.

(2) In case the main spindle head 1 ascends or descends (as referred to (FIGS. 2A and 2B), the Z-axis linear motor 26 is driven in response to a command of the NC program thereby to vertically move the pneumatic cylinder 3 fixing the main spindle head 1. At this time, the static pressure is generated in the clearance between the pneumatic cylinder 3 and the piston 4 by the action of the static pressure nozzle 4b thereby to constitute the pneumatically static bearing 6. As a result, the pneumatic cylinder 3 and the piston 4 come out of contact thereby to establish a state of zero sliding resistance.

(3) The air-releasing ring grooves 4d are formed in the piston 4 so that the static pressure difference is enlarged to generate the stronger static pressure force thereby to establish a high rigidity (as referred to FIG. 4).

Moreover, the numerous vertical grooves 4g are formed in the outer circumference of the piston 4 so that the static pressure force can be generated to hold the pneumatic cylinder 3 and the piston 4 out of contact thereby to establish the state of no sliding resistance.

Here, the invention can be modified and changed in various manners within the scope of its technical concept. For example, the invention is embodied as the balancer for the main spindle head of the vertical machine tool, but may be used as a balancer for the Y-axis saddle of a horizontal machine tool or as a balancer for a main spindle head of a transfer machine. The invention is also suitable for a balancer mechanism for an angular type slide unit.

Moreover, the Z-axis motor is embodied as the linear motor but may be exemplified by a combination of a servomotor or a ball screw. Moreover, the air communication holes 4a are formed in plurality, i.e., by four, but this number may be increased or decreased. Moreover, the vertical grooves 4g for the vertical communications are formed by twelve, but this number may be increased or decreased.

Moreover, the ball-shaped spherical bearing 5a at the leading end portion of the cylinder rod 5 may also be formed into a spherical ball bearing using a ball at the sliding portion of the spherical portion.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A pneumatically static balancer for a machine tool, which counterbalances or lightens a gravitational load generated by an own weight of a vertically moving driven member, the pneumatically static balancer comprising:
   a pneumatic cylinder supporting the driven member and allowed to move vertically;
   a pneumatically static bearing having a piston inserted into the pneumatic cylinder, the pneumatic static bearing being formed by feeding compressed air, which is in an interior of the pneumatic cylinder, into a small clearance formed between the pneumatic cylinder and the piston;
   a cylinder rod connected to an upper end of the piston; and
   a saddle supporting a leading end portion of the cylinder rod;
   wherein the piston comprises:
   a plurality of air communication holes communicating with the interior of the pneumatic cylinder; and
   a plurality of static pressure nozzles individually communicating with the air communication holes, the static pressure nozzles provided on an outer peripheral portion of the piston.

2. The pneumatically static balancer for the machine tool as set forth in claim 1,
   wherein a ring groove is formed on an upper side of the piston and near the central portion of the piston,
   the ring groove has an air exhaust passage formed in the axial direction of the pneumatically static bearing and
   the air exhaust passage communicates a first hole formed on the ring groove of the piston with a second hole formed on a lower face of the piston,
   the air exhaust passage is connected to a valve via the second hole.

3. A pneumatically static balancer for a machine tool, which counterbalances or lightens a gravitational load generated by an own weight of a vertically moving driven member, the pneumatically static balancer comprising:
  a pneumatic cylinder supporting the driven member and allowed to move vertically;
  a pneumatically static bearing having a piston inserted into the pneumatic cylinder, the pneumatic static bearing being formed by feeding compressed air, which is an interior of the pneumatic cylinder, into a small clearance formed between the pneumatic cylinder and the piston;
  a cylinder rod connected to an upper end of the piston; and
  a saddle supporting a leading end portion of the cylinder rod,
  wherein vertical grooves, of which lower end do not reach to a lower end of the piston, are formed on an outer peripheral surface of the piston in the axial direction for communicating the compressed air in the interior of the pneumatic cylinder.

* * * * *